Patented Oct. 20, 1931

1,827,794

UNITED STATES PATENT OFFICE

ALBERT LEO, OF CHICAGO, ILLINOIS

JELLY PREPARATION

No Drawing.  Application filed March 9, 1929. Serial No. 345,890.

This invention relates to a jelly preparation and more particularly to a preparation that includes in dry form all of the ingredients necessary to the making of jellies and the like.

Heretofore, in the making of jams and jellies, where pectin is used in solid form, certain precautions have been necessary in connection with the sequence of adding the various ingredients making up the jams or jellies. For instance, it is well known that if all the sugar required for the making of the final product is added at the start, before the addition of the powdered pectin, the subsequently added pectin will not go into solution properly. To avoid this difficulty, it has been common practice either to dissolve the pectin first before the addition of the sugar or else to add a relatively small proportion of the total amount of sugar required together with the pectin, the sugar when added in such smaller quantities serving as a dispersive agent for the pectin. The pectin, sugar and acid must be in solution before the jell action can take place.

It is an object of this invention to provide a jelly preparation including pectin, a suitable acid and the total requisite amount of sugar, all in dry form and adapted to be added in a single operation to water or unconcentrated fruit juices.

It is a further object of this invention to provide a jelly preparation comprised of pectin, sugar and a suitable acid treated in such a manner that their respective rates of solubility are in the order named rather than in the reverse order as is normally the case.

Other and further important objects of this invention will become apparent from the following description and appended claims.

As previously pointed out, the difficulty of preparing satisfactory jellies when using a dry mixture of pectin, sugar and acid, is due to the fact that both the acid and sugar have a considerably higher rate of solubility than the pectin, whereas to form a perfect jelly, it is essential that the pectin go into solution first. Since the jell action takes place at approximately the saturation point of sugar, it becomes necessary to have approximately this amount of sugar present, but due to the fact that pectin will not go into solution in a sugar saturated solution, it is evident that the pectin must be put into solution before saturation occurs.

I have discovered that by reversing the speed or rate of solution of each of the three dry ingredients, pectin, sugar and acid to the order in which named, the jell action readily takes place. An essential feature of my invention is the retarding of the rate of solution of the acid, in order to give sufficient time for the pectin and sugar, or at least the major part of the sugar, to go into solution before the acid is dissolved. Of the various ways in which to increase the speed of solution of the pectin, the most practical method appears to be to coat each granule of sugar with a film of pectin in accordance with the method disclosed in my copending application entitled "Jelly preparation and a process of making the same", Serial No. 328,069, filed December 22, 1928. According to this process, a fairly concentrated solution of pectin containing from 3 to 5% pectin content is sprayed or atomized into a mass of well agitated sugar, preferably the usual granulated variety. This can be accomplished by blowing a current of heated air upwardly through the mass of sugar crystals with sufficient force to thoroughly agitate the entire mass and cause a constant suspension of a part of the sugar crystals in the ascending air current. At the same time, the pectin solution is sprayed against the air suspended sugar crystals forming individual coatings of pectin upon them. If the sugar is treated according to this, or by any other suitable method, to form a film of pectin about each individual sugar granule, the pectin must then go into solution before the sugar.

According to my present invention, the solubility of the acid is retarded by coating the solid acid particles or crystals with an insoluble substance, such as a paraffin, wax or gum, having a melting point such that the substance will liquefy at the temperatures reached during the jelly making process. The melting of the water insoluble film upon the acid particles permits the water to come into contact with the acid and dissolve it, but not until after the pectin and most of the sugar have gone into solution.

The following example will serve to illustrate my method of coating the acid particles or crystals.

Three parts of paraffin are dissolved in 100 parts of ether and to this are added 100 parts of powdered citric acid, or other suitable edible acid in solid form, such as tartaric acid. The ether is then removed by evaporation, leaving the paraffin as a thin coating upon the acid crystals. Obviously, since paraffin is not soluble in water, the acid will not dissolve until the paraffin film is broken.

The paraffin coated acid is then combined with the pectin coated sugar in dry form to produce a dry, powdered product with the ingredients in requisite proportions for the making of jellies.

In using my dry jelly preparation, the mixture is combined with the liquid, either unconcentrated fruit juices or water, in a cold state, that is either at room temperatures or a little above. The pectin being in a thin film and presenting a large surface area to the liquid, goes readily into solution and the sugar quickly follows. The liquid mixture is then heated in the usual manner and when the temperature reaches the melting point temperature for the paraffin, the thin paraffin film upon the acid crystals melts and exposes the acid particles to the dissolving action of the water. The acid accordingly goes into solution after the pectin and most of the sugar are completely dissolved. The heating of the jelly mixture may be continued to approximately its boiling point, 218° F., or may be to a somewhat lower temperature depending upon the circumstances, namely, the ratio of jelly preparation to liquid and, if fruit juices are added, the sugar, pectin and acid content of the juices. No boiling may be required if the sugar content is sufficiently high at the outset to obviate concentrating.

It will be appreciated by those familiar with the art of jelly making that if the same quantities and proportions of ingredients were employed, the simultaneous addition of the separate ingredients would not result in a jelly, owing to the inability of dry pectin to go into solution in the presence of the dissolved sugar and acid. By coating the acid particles, however, in the manner above described, the solution of the acid is sufficiently retarded to enable the pectin and sugar to go first into solution. It will therefore be appreciated that such a simple procedure as is made possible in using my jelly preparation results in a considerable saving of time, labor and in care, since there are no individual weighings or measurings of the various ingredients necessary nor any particular care required as to the sequence in which the ingredients are added.

By the term "pectin" as used in this specification and the claims, is meant a substantially pure white pectin. The pectin used in the coating of the sugar crystals is, of course, in solution form. No definite concentration or strength of pectin is required, but these characteristics must be known in order that sufficient pectin be present to jellify the sugar with which it is associated. The sugar-pectin mixture may thus be said to be standardized, rather than the pectin, as formerly.

Any of the so called edible acids occurring in solid form may be used in place of citric acid. One of the important features of my invention is the coating of the acid particles or crystals with a moisture proof substance that will prevent the dissolution of the acid particles at ordinary temperatures but will, upon the application of heat, leave the acid particles free to dissolve. Ordinary varieties of paraffin have melting points from 100° F. to over 135° F. and are admirably adapted for the purpose of coating the acid particles. Any paraffin, wax, or related substance having the desired characteristics and melting point is suitable for my purpose. Obviously, other methods of coating the acid particles with the paraffin may be employed, but is has seemed simpler merely to dissolve the paraffin in a volatile solvent, such as ether, and allow the solvent to evaporate and leave the paraffin as the coating upon the acid crystals or particles.

I am aware that numerous details of the process may be varied through a wide range without departing from the principles of this invention, and I therefore do not purpose limiting the patent granted hereon otherwise than necessitated by the prior art.

I claim as my invention:

1. A jelly preparation comprising pectin, sugar and an edible acid in dry form and in the requisite proportions for jelly making, said acid having a coating formed over the individual particles thereof of a wax-like substance having a melting point below 218° F. whereby the pectin and sugar dissolve before the acid.

2. A dry, powdered preparation for forming jellies and the like comprising pectin, granulated sugar and an edible acid in which the sugar granules are individually coated with the pectin and the acid crystals individually coated with paraffin whereby when water is added to the preparation and heated the pectin, sugar and acid will dissolve therein in the order named.

3. A jelly preparation comprising comminuted pectin, sugar, and a solid, edible acid, said acid having a moisture-proof coating over its individual particles said coating being water insoluble and having a melting point below 218° F.

4. A jelly preparation comprising comminuted pectin, sugar, and an edible acid in solid form, said acid having a coating of paraffin over its individual particles.

5. A jelly preparation comprising comminuted pectin, sugar and citric acid crystals, said acid crystals having a coating of wax.

6. A jelly preparation comprising comminuted pectin, sugar, and tartaric acid crystals, said acid crystals having a coating of wax.

7. A dry preparation for forming jellies and the like comprising pectin coated granulated sugar and an edible acid in which the sugar granules are individually coated with the pectin, and the acid crystals are individually coated with a water insoluble substance having a melting point below 218° F.

In testimony whereof I have hereunto subscribed my name at Chicago, Cook County, Illinois.

ALBERT LEO.